June 19, 1923.

I. H. ATHEY 1,458,962

TRACTION MECHANISM

Filed May 29, 1920

Inventor:
Isaac H Athey

June 19, 1923.

I. H. ATHEY

TRACTION MECHANISM

Filed May 29, 1920    6 Sheets-Sheet 2

1,458,962

Inventor
Isaac H. Athey

June 19, 1923.

I. H. ATHEY

1,458,962

TRACTION MECHANISM

Filed May 29, 1920

Inventor
Isaac H Athey

June 19, 1923.

I. H. ATHEY 1,458,962

TRACTION MECHANISM

Filed May 29, 1920

Inventor:
Isaac H Athey

Patented June 19, 1923.

1,458,962

UNITED STATES PATENT OFFICE.

ISAAC H. ATHEY, OF CHICAGO, ILLINOIS, ASSIGNOR, BY MESNE ASSIGNMENTS, TO ATHEY TRUSS WHEEL CO., OF CHICAGO, ILLINOIS, A CORPORATION OF ILLINOIS.

TRACTION MECHANISM.

Application filed May 29, 1920. Serial No. 385,155.

*To all whom it may concern:*

Be it known that I, ISAAC H. ATHEY, a citizen of the United States, and resident of Chicago, in the county of Cook and State of Illinois, have invented a certain new and useful Improvement in Traction Mechanism, of which the following is a full, clear, concise, and exact description, reference being had to the accompanying drawings, forming a part of this specification.

My invention relates to improvements in traction mechanism, and is especially concerned with improvements in that type of traction mechanism in which the wheels, or load supporting elements, are of the endless track type.

The objects of my invention are:

First: To provide a traction element for a vehicle, comprising a trussed chain, having a novel type of truss link.

Second: To provide a traction element comprising a pair of spaced wheels, having a traction chain trained around the wheels, the wheels being provided with means for preventing their lateral displacement from the chain, the said means being so conformed as to prevent excessive wear between the contacting surfaces of the chain and wheel which prevents the lateral displacement of these elements relatively to each other.

Third: To provide a supporting element for a vehicle comprising a frame member, having a pair of wheels rotatably mounted on each end thereof, and a traction chain trained about said wheels, the said wheels and supporting member being so designed and conformed as to provide a maximum bearing surface for the wheels, without making it necessary to provide a traction chain of undue breadth.

Fourth: To provide a vehicle having a pair of traction elements, each comprising a traction chain trained about a pair of load supporting wheels, said traction elements being pivotally connected with the load carrying frame so that they may completely rotate about their pivot points in passing through ditches, or other similar depressions in the earth.

Fifth: To provide a vehicle having a pair of supporting elements, each comprising a beam pivotally mounted on the load supporting frame of the vehicle, a wheel mounted on each end of said beam, and a traction chain trained about the wheels of the respective beams, the supporting elements being mounted upon the load supporting frame in such a manner that they can completely rotate about their pivot points when passing through ditches and other similar obstructions.

Sixth: To provide a novel type of link for a traction chain, and

Seventh: To provide a novel type of tractor, comprising a load supporting sprocket wheel, and a traction chain trained thereabout, the traction chain and sprocket wheel being so designed as to permit the development of slackness in the bight of the chain, where it passes about the sprocket wheel.

The above, and other objects, will appear as this description progresses, reference being had to the accompanying drawings, in which.

The several sections are taken looking in the directions of the small arrows, and throughout the several figures, similar reference characters are used for referring to similar parts.

In my co-pending application, Serial No. 151,698, filed March 1, 1917, I have disclosed a traction mechanism, comprising a supporting member, having a pair of wheels mounted at each end thereof, and on opposite sides, about which is trained a traction chain, comprising a plurality of links, pivotally connected together, the traction chains being provided with inwardly extending truss arms, and a truss chain for preventing more than a pre-determined separation of the inner ends of the truss arms, whereby each traction element is afforded an outwardly convex track section. This application also discloses means whereby slack is caused to develop in the chains at the points where they pass around their respective supporting wheels, thus permitting the links of the chains to assume their load supporting position before the wheels roll upon them. The objects of my present invention are to provide certain improvements upon the traction mechanism described in my afore-mentioned patent application.

Figure 1:
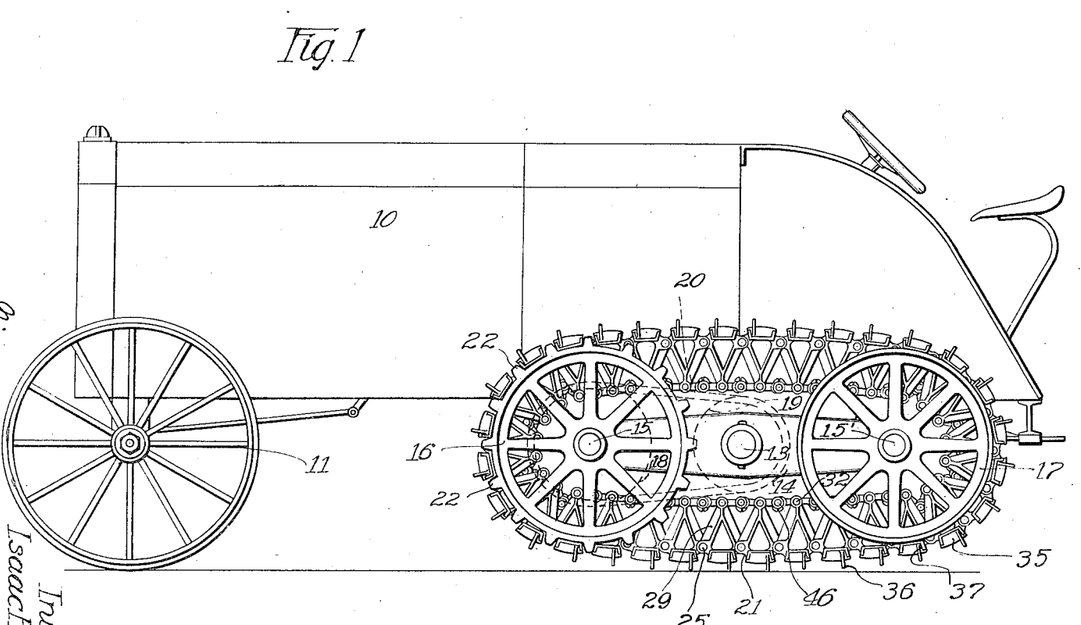
Figure 1 is a side elevation of a tractor showing one embodiment of my invention.
Figure 2:
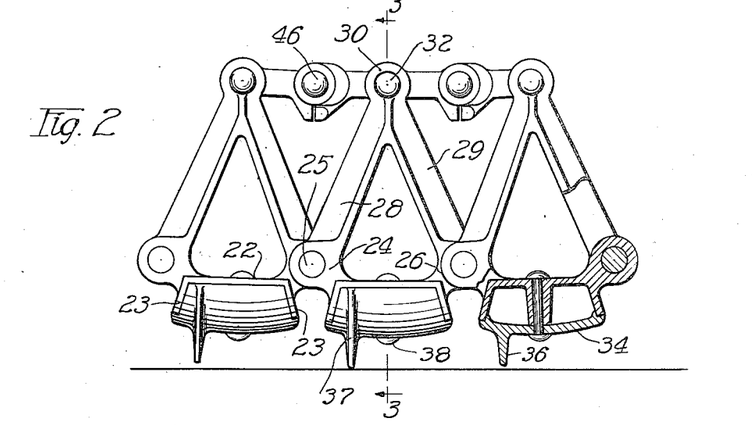
Figure 2 is a side elevation of a portion of my improved traction chain, portions thereof being broken away.
Figure 3:
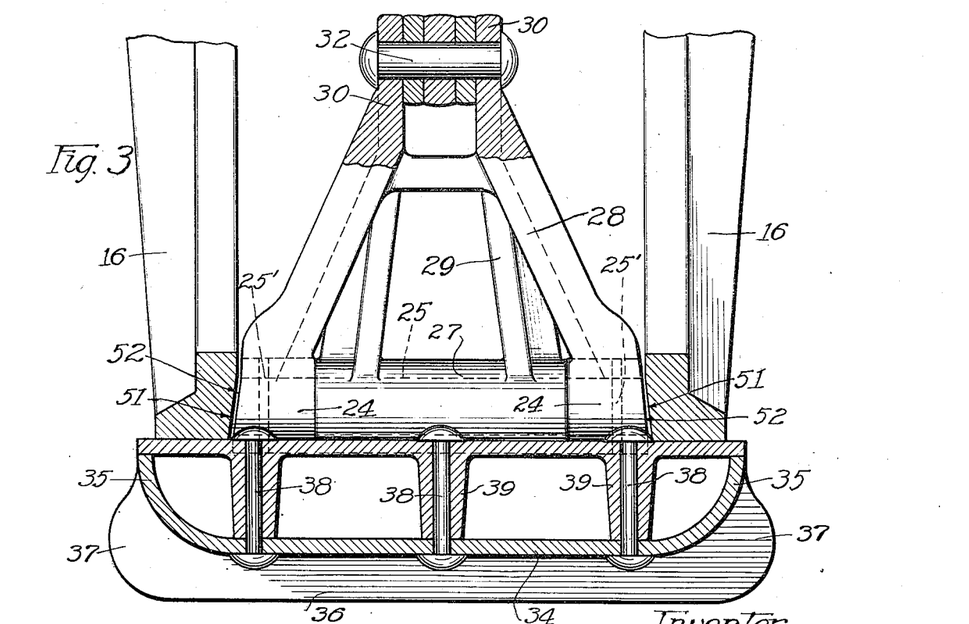
Figure 3 is an enlarged transverse section, taken on a line 3—3, of Figure 2.

Referring to the drawings, and, for the present, to Figures 1, 2 and 3, reference character 10 indicates, as a whole, a tractor, comprising the front steering wheels 11, the driving mechanism of the tractor being completely enclosed, and forming no part of my present invention. Reference character 13 indicates the rear axle of my improved tractor, upon opposite ends of which are rotatably mounted the longitudinally extending beams 14. Shafts 15 and 15' are rotatably mounted in the front and rear end, respectively, of the beams 14. Mounted on the ends of the shaft 15 and on opposite sides of the beam 14 are a pair of sprocket wheels 16, (see Fig. 3). A similar pair of wheels 17, only one of which is shown, are mounted on the ends of the shaft, 15', and on opposite sides of the beam 14. The wheels 17 are preferably not provided with sprocket teeth. A sprocket gear 18 is secured to the inner end of the shaft 15 and is driven from the pinion 19 through the chain 20, the pinion 19 being concentric with the axle 13 and driven from the engine of the tractor in any suitable manner. A traction chain, indicated as a whole by the reference character 21, is trained around the wheels 16 and 17 in such a manner that the teeth 22 of the sprocket wheel 16 engage between the sides of adjacent track links.

The details of construction of the links of the chain 21 are more clearly illustrated in Figures 2 and 3, to which reference is directed. Each track link comprises an inverted channel 22, the sides 23 of which are inclined outwardly from the back of the channel at an angle of approximately 76 degrees. A pair of spaced extensions 24 extend inwardly and away from one of the inner edges of the channel member, and are provided with suitable bores for receiving one end of the pivot pin 25.

The opposite edge of the channel member is provided with a single elongated extension 26 carrying the bearing 27 (see Fig. 3) which is adapted to project between the extensions 24 of the adjacent link in alignment with the openings formed therein to form a bearing for the pin 25. I preferably provide pins 25' shown in dotted outline in Figure 3, which extend through the ends of the pins and the bearing portions, supported by the extensions 24, to prevent lateral displacement of the pins relatively to the links.

At each end of the track links, arms 28 and 29 extend inwardly, upwardly and toward each other from the bearings carried by the extensions 24 and 26 respectively, and join at their top to form an integral truss arm, carrying a bearing 30 at its top, for receiving a pivot pin 32, the function of which will be referred to later on. It will be noted from an examination of Figure 3 that the upper ends of the truss arms, described above, are spaced apart longitudinally of the link. This is to provide room for the ends of the links, forming the truss chain, the details of which will be described later on.

The open sides of the channels 22 are closed by means of the tread members 34, the ends of which curve upwardly as shown at 35 in Figure 3, to completely close the ends of the channel. The tread members are provided with longitudinally extending traction lugs 36, which extend slightly beyond the ends of the track links, as shown at 37, to engage with the sides of the ruts formed by the traction element. The tread members 34 are secured to the channel by means of the rivets 38, or other suitable means, bosses 39 being provided to support the central portions of the tread member.

Figure 9:
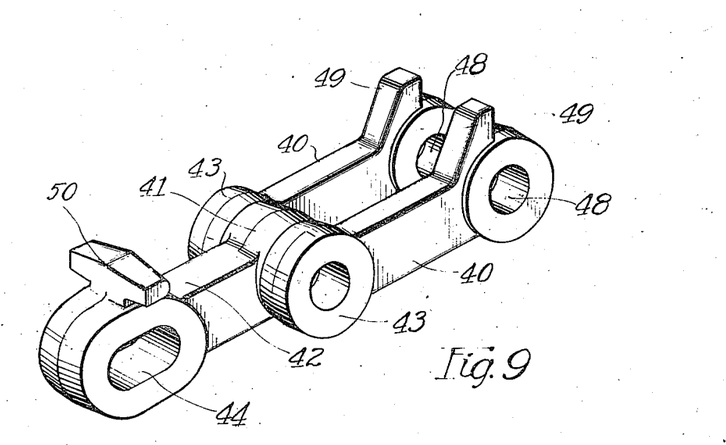
Figure 9 is a perspective view of a portion of my improved truss chain.

For trussing the upper ends of the truss arms, I provide a truss chain, formed of links, such as those disclosed in Figure 9. Referring to this figure, the reference characters 40 indicate a pair of links, which are spaced apart by the interposed end 41 of the link 42, the ends 43 of the links 40 and the end 41 of the link 42 being provided with aligned openings for receiving the pivot pin 32, shown in Figures 2 and 3. The other end of the link 42 is provided with a longitudinally extending slot 44 adapted to receive the pivot pin 46 (see Figs. 1 and 2) the outer ends of which are mounted in the openings 48 of the links 40. The links 40 are provided with inwardly extending lugs 49, which are adapted to co-act with the transversely extending lug 50 of the adjacent link 42, to deflect the ends of the links, having the pin and slot connection, outwardly, when the links begin to fold around the load supporting wheels, as shown in Figure 1. When the truss arms of two adjacent links approach each other because of the links beginning to wrap around one of the wheels, the distance between their ends decreases, thereby bringing the lugs 49 and 50 into contact with each other, whereupon continued movement of the inner ends of the truss arms toward each other will cause the ends of the links provided with the lugs to be deflected outwardly. When the links 42 and 40 are acting as trusses for the truss arms, that is, when they are in alignment with each other, the lugs 49 and 50 are spaced slightly from each other.

From an inspection of Figure 3 it will be seen that the ends of the channel members project beyond the lower ends of the truss arms, and the ends of the pivot pins, to provide a tread portion for the peripheries of the load-supporting wheels, and that the lower ends of the truss arms and the ends of the pins form means for preventing lateral displacement of the wheels relatively to the track links.

To prevent the sharp inner corners or edges of the wheels 16 from shearing the outer sides of the lower ends of the truss members, and the pivot pins, as the wheels roll upon each succeeding link, I bevel the inner sides of the wheels as shown at 51, and form a corresponding bevel 52 on the outsides of the lower ends of the truss arms.

From an inspection of Figure 1, it will be noted that the width of the channel members is somewhat less than the width of the spaces between the sprocket teeth 22. By placing the pivot pins inside of the tread portions or surfaces, of the track links, upon which the wheels roll, the track portion of the chain will expand in passing around the wheels, and thereby permit the development of sufficient slack in the bights of the chains to permit the links at the forward end of the chain to assume their load supporting position before the entire weight of the vehicle, carried by the sprocket wheels, rides upon the link, thereby reducing the wear on the pivot pins to a minimum. In a similar manner, the slack developed in the bight of the chain surrounding a rear wheel insures the rear wheel having rolled off the succeeding links before they are rotated about their pivot points to cause them to pass around the rear wheel. By making the channel member of the track links of less width than the spaces between the sprocket teeth, the slack developed in the bight of the chain is permitted to develop at the lower side of the wheel, because the links can drop downwardly over the wheel a distance corresponding to the amount of slack developed.

I preferably make the distances between adjacent pivot pins 32 less than the distance between the adjacent pivot pins 25, thereby causing the section of track extending between the lower sides of the two wheels, which I prefer to refer to as the track section, to be arched, or convexed outwardly, or downwardly, as shown in Figure 1.

Figure 4:
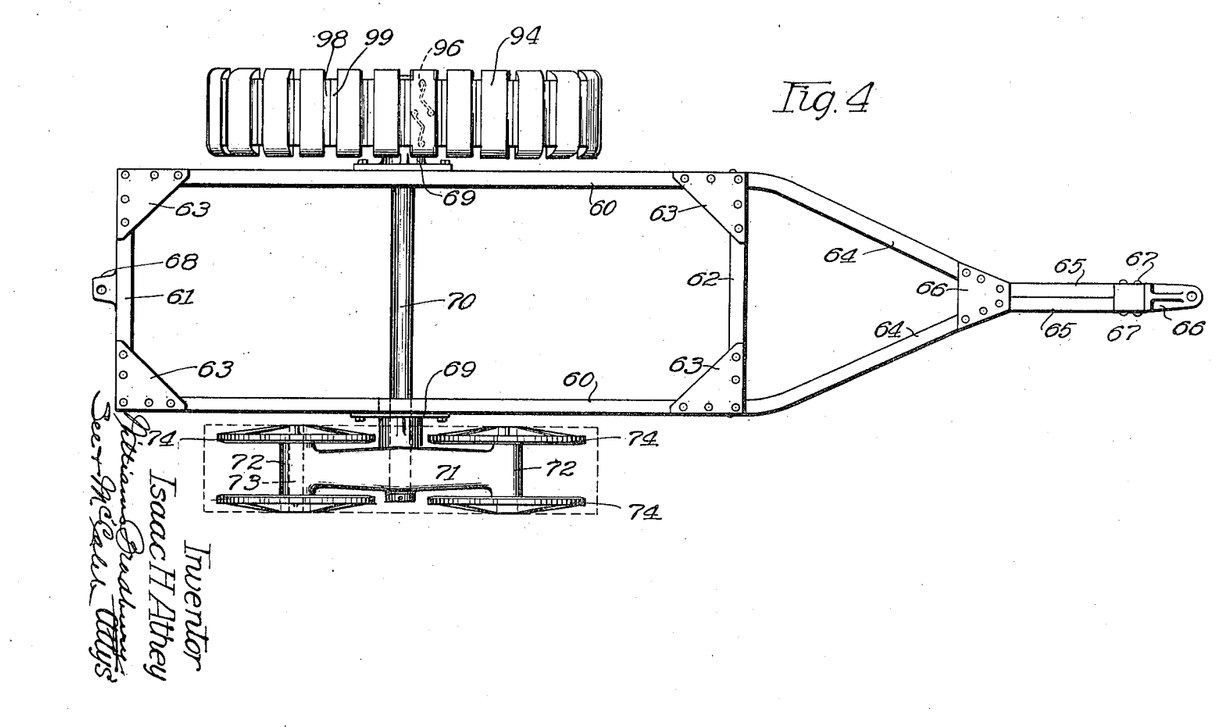
Figure 4 is a plan view of a trailer, embodying a slight modification of my invention, the traction chain being removed from one of the traction elements.

In Figures 4 to 8 inclusive I have illustrated a modified embodiment of my invention. While I have illustrated it in connection with a trailer construction, it is to be understood that the invention disclosed in these figures is applicable to a tractor construction, and may be used interchangeably with the traction element construction shown in Figures 1 to 3 inclusive. In Figure 4 I have shown a load supporting frame, comprising the side beams 60 and the cross beams 61, and 62, which are secured together by suitable angle plates, 63, which may be riveted to the flanges of the beam 60, preferably formed of I or channel beams. The forward ends of the beams 60 are bent toward each other as shown at 64, and then parallel with each other as shown at 65. A coupling member 66 is secured to the forward ends 65 of the beams by rivets 67, or any other suitable member. The coupling member 66 is adapted to be connected with a coupling member similar to that shown at 68, secured to the rear end of the tractor or trailer.

Bearings 69 are secured to the outer sides of the beams 60, and carry the axle 70, the ends of which project beyond the bearing 69 and rotatably support the beams, or frame members 71. Each end of the beams 71 is provided with a transversely extending bearing 72. A shaft 73 is rotatably supported in each of the bearings 72. A pair of load supporting wheels 74 is keyed to the opposite ends of the shaft 73 and upon opposite sides of the beams 71. A traction chain,—indicated as a whole by the reference character 75, is trained around the two pairs of wheels 74. The distance between the two shafts 73 is such that a slight amount of slack is permitted to develop in the bights of the chains, to permit the links to assume their load supporting positions before the load is imposed thereon.

Figure 6:
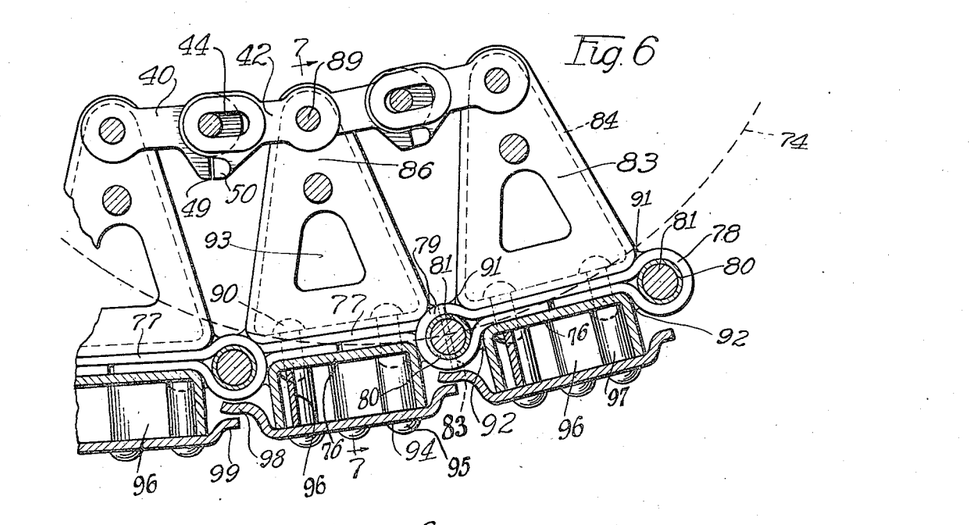
Figure 6 is a longitudinal section through the modified embodiment of my improved traction chain, portions thereof being broken away.
Figure 7:
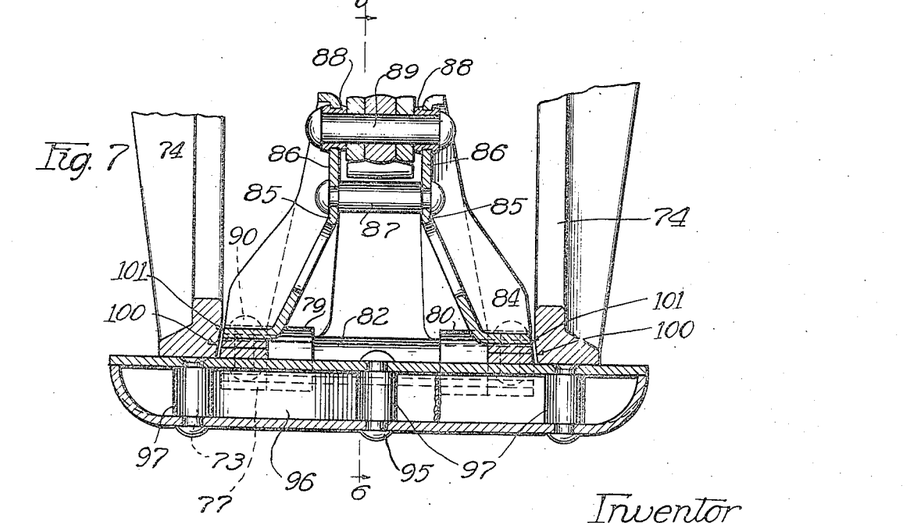
Figure 7 is a vertical transverse section, taken on a line 7—7, of Figure 6.

The construction of the links of the chain 75 is somewhat different from the construction of the links of the chain 21. The links each comprise an inverted channel member 76, adjacent the ends of which are transversely extending pivot pin supporting members indicated as a whole by the reference character 77, which are formed by reversely bending a strip of metal upon itself to form the two loops 78 and 79, and an intermediate connecting member, which extends across the back of the channel 76. The loops 78 and 79 embrace bushings 80 for receiving the ends of the pivot pins 81. On alternate track links, the pivot pin supporting members 77 are placed closer together than those on the remaining links, so that the loops 78 and 79 of these links will lie between and in alignment with the corresponding loops on adjacent track links, as shown in Figure 7. A single bearing bushing 82 is supported by the loops 79 and 80 on each side of the link, in which the supporting members 77 are closer together, and forms a bearing for the pivot pin. The ends of the pivot pins are preferably secured in the loops lying at the outer ends of the pins by means of rivets such as shown at 83 in Figure 6, which extend through the supporting loops, the bearing and the pivot pin.

The truss arms comprise triangularly shaped sheet metal plates 83, each having a continuous flange 84, extending outwardly from the edges thereof, the metal plates being transversely bent at 85 to provide the vertical extending portions 86, which are secured together and spaced by a spacer rivet 87. The upper ends of the truss arms are provided with re-enforced bushings 88 for receiving the pivot pin 89 for the truss chain, the construction of which is similar to that illustrated in Figures 1 to 3 inclusive. To secure the pivot pin supporting members 77, and the truss arms to the channel, I preferably use rivets 90 extending through the base flange of the truss arm, and the corresponding supporting member 77, and the back or bottom of the channel member 77. To increase the rigidity of the entire construction, I then preferably weld the base of the truss arm to the supporting member as shown at 91, and also weld the supporting member to the channel member as indicated at 92. It will be noted that the triangularly shaped truss arms are provided with openings 93 which perform the same function as the openings between the arms 28 and 29 of the track links shown in Figures 1 to 3 inclusive, namely, to permit the discharge of mud, dirt and other foreign matter, which might otherwise accumulate between the truss arms.

Figure 5:
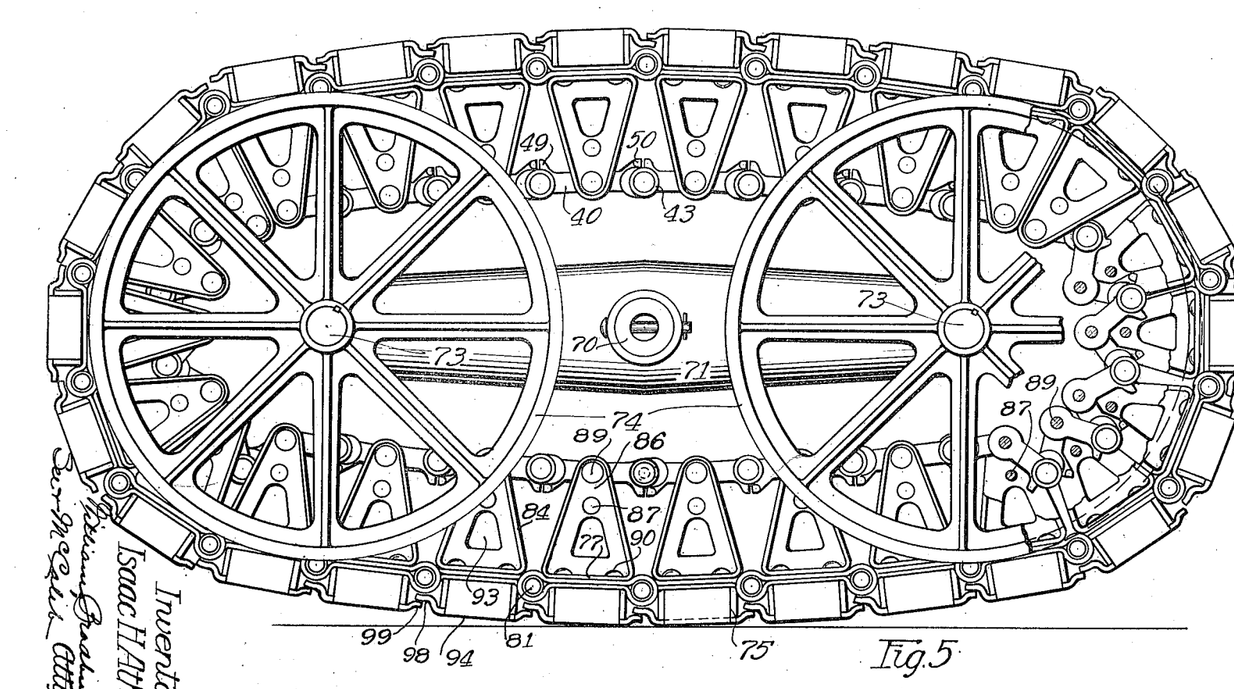
Figure 5 is a side elevation of the modified form of my invention.

The open sides of the channel members 76 are closed by means of the sheet metal tread members 94, which are secured to the channel members by means of rivets 95, passing therethrough and through the backs of the channel members, the central portions of the tread members being separated by the spacers 96 the shape of which is clearly indicated in 96, these spacers being formed from strips of sheet metal, having the bushings 97 formed at the ends thereof, through which the rivets 95 pass. The tread members of adjacent links are provided with overlapping edges 98 and 99, as shown in Figures 5 and 6, which tend to exclude dirt and other foreign matter from the spaces between adjacent sides of the channel members 76.

It will be noted from inspection of Figure 7 that the co-acting surfaces 100 and 101 of the contacting portions of the load supporting wheels and the outsides of the truss arms are beveled in the same manner as the corresponding parts 51 and 52 of Figure 3 for the same purpose.

In the embodiment of my invention, illustrated in Figures 5 to 8 inclusive, I have shown the centers of the pivot pins 81 as lying in the plane of the tread surfaces, on which the load supporting wheels roll in place of being displaced inwardly, as in the construction shown in Figures 1 to 3 inclusive. I prefer to use this construction in building trailers, because it lengthens the permissible length of the truss arm and correspondingly strengthens the traction chain. I can, however, use links in which the centers of the pivot pins are offset inwardly from the wheel supporting surfaces, just the same as in Figures 1 to 3 inclusive, in which case the slack in the bights of the chain will develop in just the same manner as it does in Figure 1 and the centers of the shafts 73 can be spaced from each other a slightly greater distance.

Figure 8:
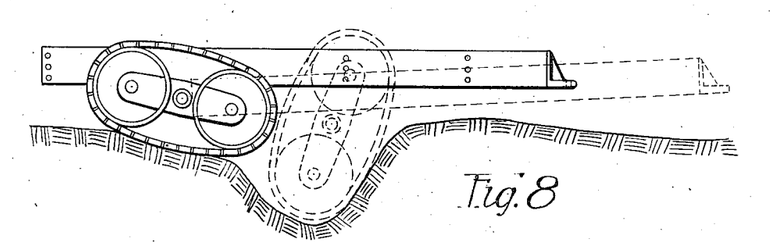
Figure 8 is a more or less diagrammatic view, showing the positions assumed by the traction elements of a vehicle, embodying the same, while passing through a ditch or other similar depression in the earth.

In Figure 8, I have illustrated the action of my improved traction element in passing through a ditch or other similar depression in the earth's surface. It will be noted that as the traction elements pass out of the ditch, the ends thereof will be reversed relative to the position they occupy in entering the ditch, in other words, the traction element has turned completely over. This, in no way, interferes with the proper functioning of the traction element. The traction element shown in Figure 1 can operate in a similar manner. In Figure 4, I have illustrated the supporting wheels as being dished, to bring their peripheries over the ends of the bearings which support the shafts for the wheels. This construction permits the use of comparatively long bearings for the wheel supporting shafts, without making it necessary to unduly increase the width of the track chain.

While I have described the details of construction of the preferred embodiment of my invention, it is to be clearly understood that my invention is not limited to these details, but is capable of other adaptations, and modifications within the scope of the appended claims.

Having thus described my invention, what I claim is:

1. An endless supporting and traction chain for vehicles, comprising a plurality of track links, having their adjacent sides pivoted together, and provided with inwardly projecting truss arms, two truss links pivotally mounted in spaced relation adjacent the inner end of each truss arm, to rotate about an axis extending transversely of said chain, a third truss link mounted to rotate about the axis of said pair of truss links, and holding said pair of links in spaced relation, a pin and slot connection between the spaced truss links of one track link, and the third truss link of an adjacent track link, and co-acting lugs on the outer sides of said spaced and third truss links for deflecting said truss links from a straight line when the inner ends of said truss arms approach each other.

2. An endless supporting and traction chain for vehicles, comprising a plurality of track links, having their adjacent sides pivoted together, and provided with inwardly projecting truss arms, two truss links pivotally mounted in spaced relation adjacent the inner end of each truss arm, to rotate about an axis extending transversely of said chain, a third truss link mounted to rotate about the axis of said pair of truss links, and holding said pair of links in spaced relation, a pin and slot connection between the spaced truss links of one track link, and the third truss link of an adjacent track link, and co-acting means on the sides of said spaced and third truss links for deflecting said truss links from a straight line when the inner ends of said truss arms approach each other.

3. An endless supporting and traction chain for vehicles, comprising a plurality of track links, having adjacent sides pivotally connected, truss arms extending inwardly from said track links, two truss links pivotally mounted adjacent the inner ends of each truss arm to rotate about an axis extending transversely of said chain, the free end of one truss link of one truss arm being connected with the free end of the truss link on an adjacent truss arm, by a pin and slot connection, and co-acting means on said truss links for deflecting the connected links from a straight line upon movement of the truss arms toward each other.

4. An endless supporting and traction chain for vehicles, comprising a plurality of track links, having adjacent sides pivotally connected, truss arms extending inwardly from said track links, two truss links pivotally mounted adjacent the inner ends of each truss arm to rotate about an axis extending transversely of said chain, the free end of one truss link of one truss arm being connected with the free end of the truss link on an adjacent truss arm, by a pin and slot connection, and co-acting means for deflecting the connected links from a straight line upon movement of the truss arms toward each other.

5. An endless supporting and traction chain for vehicles, comprising a plurality of track links, having adjacent sides pivotally connected, truss arms extending inwardly from said track links, a pair of truss links connecting the inner end of each truss arm with the inner ends of each adjacent truss arm, and means forming a part of said truss links for causing said truss links to fold on each other when the inner ends of said truss arms approach each other.

6. An endless supporting and traction chain for vehicles, comprising a plurality of track links, pivotally connected, a truss arm extending inwardly from each track link, a pair of truss links connecting each truss arm with each adjacent truss arm, the free ends of said truss links being connected by a pin and slot connection, and means for initially deflecting said truss links from a straight line upon the approach of the inner ends of said truss arms toward each other.

7. An endless supporting and traction chain for vehicles, comprising a plurality of track links pivotally connected together, a truss arm extending inwardly from each track link, a pair of truss links connecting each truss arm with each adjacent truss arm, and means for causing a deflection of said truss links upon the initial approach of the inner ends of said truss arms toward each other, comprising lugs extending outwardly from the sides of said truss links, one of said truss links being provided with a longitudinal slot for permitting a limited inward movement of the inner ends of said truss arms toward each other.

8. An endless supporting and traction chain for vehicles, comprising a plurality of track links pivotally connected together, a truss arm extending inwardly from each track link, a pair of truss links connecting each truss arm with each adjacent truss arm, and means for causing a deflection of said truss links upon the initial approach of the inner ends of said truss arms toward each other, comprising lugs extending from the sides of said truss links.

9. An endless supporting and traction chain for vehicles, comprising a plurality of track links pivotally connected together, a truss arm extending inwardly from each track link, a pair of truss links connecting each truss arm with each adjacent truss arm, and means for causing an initial deflection of said links upon the approach of the inner ends of said truss arms toward each other, comprising a projection extending from one of said links.

10. An endless supporting and traction chain for vehicles, comprising a plurality of track links pivotally connected together, a truss arm extending inwardly from each track link, a pair of truss links connecting each truss arm with each adjacent truss arm, and means for causing an initial deflection of said links upon the approach of the inner ends of said truss arms toward each other, the said means being ineffective after causing said initial deflection to cause further deflection of said links.

11. A vehicle having a supporting element comprising a beam, having an elongated transversely extending bearing portion at each end thereof, a pair of wheels mounted on each bearing portion, the wheels on the respective pairs lying on opposite sides of said beam, and being dished to bring their peripheries over said bearing portions.

12. A vehicle having a supporting element comprising a beam, having an elongated transversely extending bearing portion at each end thereof, a pair of wheels mounted on each bearing portion, the wheels on the respective pairs lying on opposite sides of said beam, and having their peripheries extending over said bearing portions.

13. A vehicle comprising a frame member, a pair of wheels mounted on said frame member in spaced relation, a traction chain trained around said wheels, said traction chain comprising a plurality of links, pivotally connected in spaced relation, said links comprising tread portions for said wheels, lying outwardly from the pivot point of said links, said pivotal connection between said links being formed between projections extending rigidly from said links, and sprocket teeth on one of said wheels for projecting between opposed sides of adjacent links, the space between adjacent sprocket teeth being greater than the width of the portions of said links lying between said sprocket teeth, whereby slack is permitted to accumulate in the bight of the chain passing around the toothed wheel.

14. A link for a traction chain comprising an inverted channel member, a pivot pin supporting member on the back of said channel adjacent each end, and extending transversely thereof, said supporting members each comprising a metal strap, bent upon itself to provide a loop adjacent each side of said channel member, and two superimposed straps extending across the back of said channel member, a truss arm for each end of said link, comprising a substantially triangular sheet metal plate having a continuous flange extending around its edges, rivets extending through the base flanges of said plates, and the said superimposed straps at the respective ends of said link, for securing said pivot pin supporting members, and said truss arms to said channel members, bearing bushings in said loops and a tread member closing the open side of said channel member, the ends of said tread member being bent across the ends of said channel member.

15. A link for a traction chain comprising an inverted channel member, a pivot pin supporting member on the back of said channel adjacent each end, and extending transversely thereof, said supporting members each comprising a metal strap, bent upon itself to provide a loop adjacent each side of said channel member, and two superimposed straps, extending across the back of said channel member, a truss arm for each end of said link, comprising a substantially triangular sheet metal plate, having a continuous flange extending around its edges, and rivets extending through the base flanges of said plates and the said superimposed straps at the respective ends of said link, for securing said pivot pin supporting members and said truss arms to said channel members bearing bushings in said loops.

16. A link for a traction chain comprising an inverted channel member, a pivot pin supporting member on the back of said channel adjacent each end, and extending transversely thereof, said supporting members each comprising a metal strap, bent upon itself to provide a loop adjacent each side of said channel member, and two superimposed straps, extending across the back of said channel member, a truss arm for each end of said link, comprising a substantially triangular sheet metal plate, having a flange at its base, means extending through the flanges of said plates and the said superimposed straps at the respective ends of said link, for securing said pivot pin supporting member and said truss arms to said channel members, and bearing bushings in said loops.

17. A link for a traction chain comprising an inverted channel member, a pivot pin supporting member on the back of said channel adjacent each end, and extending transversely thereof, said supporting members each comprising a loop adjacent each side of said channel member, and a connecting member extending across the back of said channel member, a truss arm for each end of said link, comprising a substantially triangular sheet metal plate, having a flange at its base, means extending through the flanges of said plates, and the said connecting members at the respective ends of said link, for securing said pivot pin supporting members, and said truss arms to said channel members, and bearing bushings in said loops.

18. A link for traction chains comprising an inverted channel member, a truss arm comprising a triangular sheet metal plate having a flange around its edges, and means for securing the base flange to the back of said channel member.

In witness whereof, I hereunto subscribe my name this 25th day of May, 1920.

ISAAC H. ATHEY.

Witnesses:
EDNA V. GUSTAFSON,
OLIVER H. PARMALEE.